United States Patent
Roth

(10) Patent No.: US 9,616,606 B2
(45) Date of Patent: Apr. 11, 2017

(54) COOLING DEVICE AND COOLING METHOD FOR AN EXTRUDATE

(75) Inventor: Michael Roth, Bad Oeynhausen (DE)

(73) Assignee: BATTENFELD-CINCINNATI GERMANY GMBH, Bad Oeynhausen (DE)

( * ) Notice: Subject to any disclaimer, the term of this patent is extended or adjusted under 35 U.S.C. 154(b) by 757 days.

(21) Appl. No.: 13/983,579

(22) PCT Filed: Feb. 1, 2012

(86) PCT No.: PCT/EP2012/051718
§ 371 (c)(1),
(2), (4) Date: Aug. 5, 2013

(87) PCT Pub. No.: WO2012/104359
PCT Pub. Date: Aug. 9, 2012

(65) Prior Publication Data
US 2013/0307179 A1 Nov. 21, 2013

(30) Foreign Application Priority Data
Feb. 3, 2011 (DE) .......................... 10 2011 003 604

(51) Int. Cl.
*B29C 47/00* (2006.01)
*B29C 43/22* (2006.01)
*B29C 47/92* (2006.01)
*B29C 43/24* (2006.01)
(Continued)

(52) U.S. Cl.
CPC ............ *B29C 47/004* (2013.01); *B29C 43/22* (2013.01); *B29C 43/24* (2013.01); *B29C 47/0021* (2013.01); *B29C 47/907* (2013.01); *B29C 47/92* (2013.01); *B29C 47/884* (2013.01); *B29C 47/8845* (2013.01); *B29C 47/906* (2013.01); *B29C 2947/92209* (2013.01);
(Continued)

(58) Field of Classification Search
CPC ... B29C 43/24; B29C 47/884; B29C 47/8845; B29C 47/906; B29C 47/004; B29C 2947/92209; B29C 2947/92647; B29C 2947/92704
USPC ........... 264/210.1, 210.2, 175, 232; 425/170, 425/363, 367
See application file for complete search history.

(56) References Cited

U.S. PATENT DOCUMENTS

| 4,214,857 A | 7/1980 | Marquardt et al. |
| 8,262,966 B2 | 9/2012 | Becker et al. |

(Continued)

FOREIGN PATENT DOCUMENTS

| DE | 3521331 A1 | 1/1986 |
| DE | 3802095 A1 | 8/1989 |

(Continued)

*Primary Examiner* — Alison L Hindenlang
*Assistant Examiner* — Lawrence D Hohenbrink, Jr.
(74) *Attorney, Agent, or Firm* — Leydig, Voit & Mayer, Ltd.

(57) ABSTRACT

A device for sizing and cooling an extruded flat product made of plastic material includes at least two main rolls and a polishing stack including a plurality of rolls arranged in tandem and disposed downstream of the main rolls. An adjustable sizing nip is disposed between all of the adjacent respective rolls. The sizing nip is adjustable so as to pinch the flat product during an extrusion process to a greater or a lesser extent.

7 Claims, 3 Drawing Sheets

(51) Int. Cl.
*B29C 47/88* (2006.01)
*B29C 47/90* (2006.01)

(52) U.S. Cl.
CPC .............. *B29C 2947/92647* (2013.01); *B29C 2947/92704* (2013.01); *B29C 2947/92923* (2013.01)

(56) References Cited

U.S. PATENT DOCUMENTS

2005/0263939 A1* 12/2005 Krampf ............... B29C 47/0021
   264/175
2006/0260484 A1   11/2006 Mizunuma et al.
2010/0109180 A1*  5/2010 Becker ................ B29C 47/0021
   264/40.1

FOREIGN PATENT DOCUMENTS

| DE | 102005006412 | | 8/2006 |
|----|--------------|----|--------|
| EP | 1600277 | A2 | 11/2005 |
| EP | 2184156 | A2 | 5/2010 |
| JP | 2004050690 | A | 2/2004 |

\* cited by examiner

COOLING DEVICE AND COOLING METHOD FOR AN EXTRUDATE

CROSS REFERENCE TO RELATED APPLICATIONS

This application is a U.S. National Phase application under 35 U.S.C. §371 of International Application No. PCT/EP2012/051718, filed on Feb. 1, 2012, and claims benefit to German Patent Application No. DE 10 2011 003 604.0, filed on Feb. 3, 2011. The International Application was published in German on Aug. 9, 2012, as WO 2012/104359 A1 under PCT Article 21 (2).

FIELD

The invention relates to a device for sizing and cooling an extruded flat product made of plastics material, consisting of at least two main rolls, a polishing stack region having rolls arranged in tandem being placed downstream of the main rolls, and to a corresponding method.

BACKGROUND

In the field of plastics processing, thermoforming is a recognised method for the mass production of lids, vessels and bowls used as packaging.

Sheeting for this process for food is typically between 150 and 3,000 μm thick. For technical components (automotive, household, etc.), sheet thicknesses of up to 15 mm are also common.

The sheeting suitable for the thermoforming process is produced on polishing stack systems. Generally, polishing stacks with three rolls are used for this purpose and, in the case thereof, one or two adjustable nips are produced using various mechanical roll feed concepts. Coming from a slit die, the plastics material is sized in the polishing stack, and the surface finish of the sheeting is produced. The melt emerging from the extruder is sized and cooled down. Post-cooling rolls are sometimes placed downstream in order for the required end temperature to be reached.

The above-described prior art is limited in terms of output, since there is a maximum of two nips with which to size the sheeting surface. If, however, the operational capacity is increased, it can then be seen that the already sized sheeting surface melts again, triggered by the core heat of the sheeting, and the surface formation, which is designed so as to be high gloss but also to have an embossed structure in some regions, is destroyed. This shortcoming becomes greater with increasing sheeting thickness. The output limit is determined by the first two nips and the cooling properties of the two to three cooling rolls associated therewith.

Attempts have been made to remedy these limitations using various methods:
  Dual- and multiple-passage system design:
  This has shortcomings since such a wide machine becomes disproportionately more difficult to handle with increasing width. In addition, investment costs increase although the achievable sheeting tolerances decrease.
  Use of thinner wall thicknesses for the rolls and use of materials of higher conductivity:
  This has shortcomings because the mechanical instability rises with decreasing casing thickness. The higher the conductivity of materials (e.g. copper), the more vulnerable the roll surfaces are to mechanical damage.
  Selection of larger roll diameters to lengthen the cooling path:
  This has shortcomings because the ease of handling the machine is determined by the distance from the extrusion die to the roll and thus to the nip, yet this distance between the die and the nip widens consistently as the roll diameter becomes larger. In addition, operation at low take-off speeds is rendered more difficult, and thus so too are the start-up and switchover processes. The cooling itself is substantially less even with the long, one-sided cooling (one side steel-one side air) and the sheeting is thus less uniform.

DE 10 2005 006 412 additionally proposes placing a cooling path of roll pairs arranged in tandem downstream of a polishing stack, it thereby being possible to cool and shape the sheeting over a longer path.

SUMMARY

In an embodiment, the present invention provides a device for sizing and cooling an extruded flat product made of plastic material including at least two main rolls and a polishing stack including a plurality of rolls arranged in tandem and disposed downstream of the main rolls. An adjustable sizing nip is disposed between all of the adjacent respective rolls. The sizing nip is adjustable so as to pinch the flat product during an extrusion process to a greater or a lesser extent.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
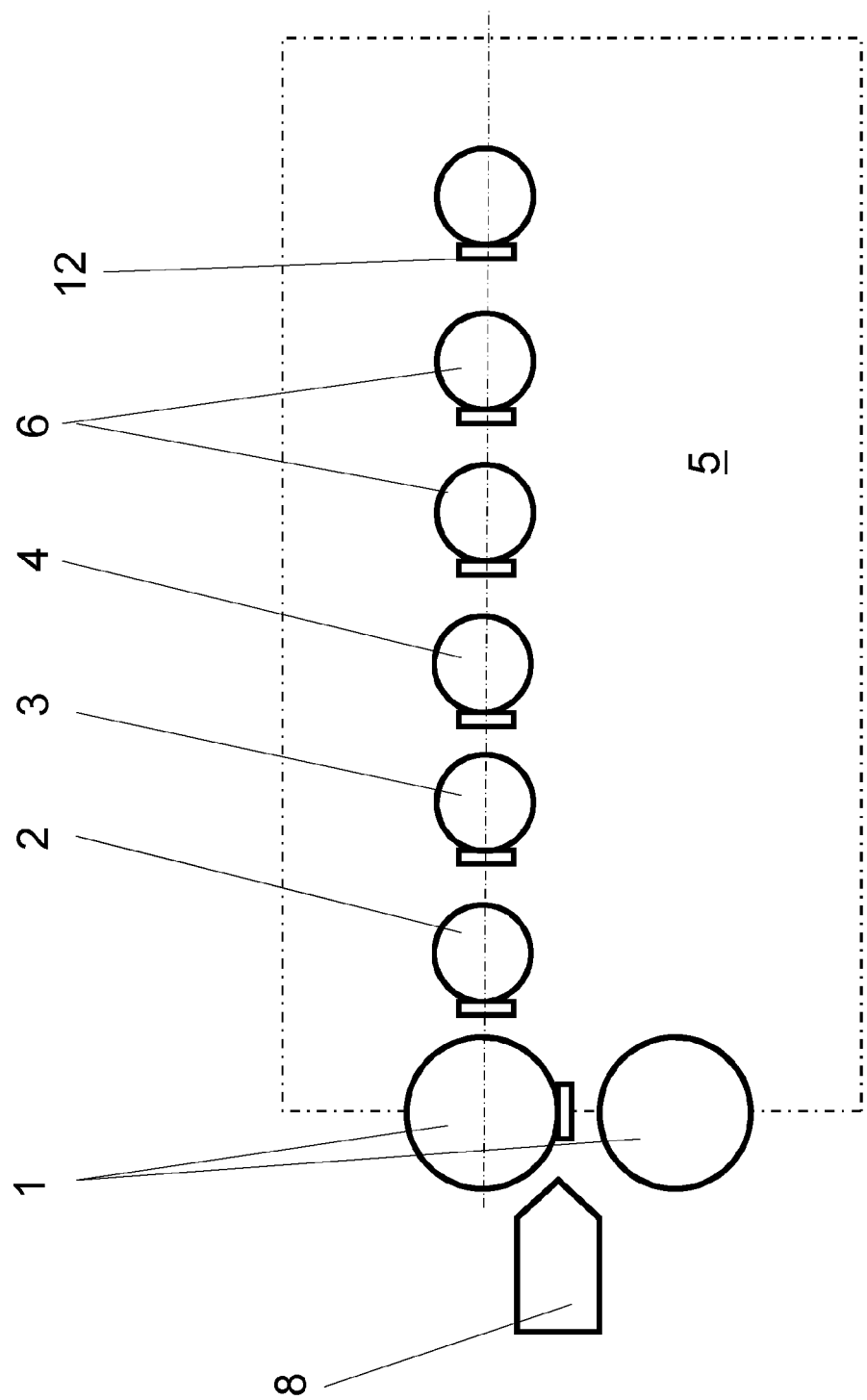
FIG. 1 shows a device in accordance with an embodiment of the invention, without sheeting, in the open state.

An aspect of the invention is to provide a device and an associated method which can be used for different sheeting thicknesses and with which a more uniform sheeting quality can nevertheless be achieved.

In an embodiment, the present invention provides a device for sizing and cooling an extruded flat product including main rolls and a polishing stack with rolls arranged in tandem, where there is an adjustable sizing nip between all the rolls, the sizing nip being adjustable during the extrusion process and the flat product thereby being pinched to a greater or lesser extent in the sizing nip. It is thus possible to act individually on the extruded plastics sheeting and to produce a high-quality product.

It is particularly advantageous if different sizing nips are able to be set between the individual rolls, thereby making it possible to counter deviations in the sheeting thickness which occur during production and, where appropriate, the not entirely homogenous cooling efficiency in the rolls.

According to a development, it is provided that the distance between the rolls can be adjusted such that no sizing nip occurs, the flat product thus not being pinched. Indeed, in this case the sheeting still circulates around the rolls virtually through a nip, yet this nip, on account of the very large distance separating the rolls, has no additional influence on the sheeting. Only the cooling is performed by the rolls; pinching and deformation of the sheeting does not take place in this region.

Each of the rolls may either simply just revolve or support the conveyance of the sheeting, for which reason it is provided according to a development that the rolls can be driven individually or together.

The rolls may also be tempered to support the cooling on one side, but also to maintain part of the sheeting at a specific temperature and thus to cool said part less or even to gently reheat said part.

The sheeting passes through the rolls virtually in a wave and thus comes into contact with the rolls once via one side and once via the other. In order for the impact of the contact area between the rolls and the sheeting surface to be substantially the same for the two sheeting sides, which impact occurs in particular with thicker sheeting on account of heat conduction, a development provides that the diameter of the main rolls and of the downstream rolls is selected such that the contact area between the flat product and the rolls is substantially the same on the two sides of the flat product.

In order for it to be possible to intervene directly in the process, it is further provided that the temperature of the flat product can be monitored by means of a plurality of temperature measurement points and the sizing nip can be adjusted individually according to the temperature.

The present invention also provides a method for influencing the quality of the flat product using the embodiments of the described device.

The device according to the invention makes it possible to intervene directly in the process when producing extruded flat products and to influence the quality of the product.

FIG. 1 shows the two main rolls 1, in the nip of which plastics compound for the sheeting is introduced from a slit die 8. The polishing stack 5 comprises a plurality of rolls 2, 3, 4. The arrangement of the rolls is selected such that a roll nip is formed with respect to each adjacent roll.

The distance between the rolls can be adjusted and can thus be set to different sizing nips. In FIG. 1 all the rolls are set at a distance and thus do not yet form a sizing nip.

Figure 2:
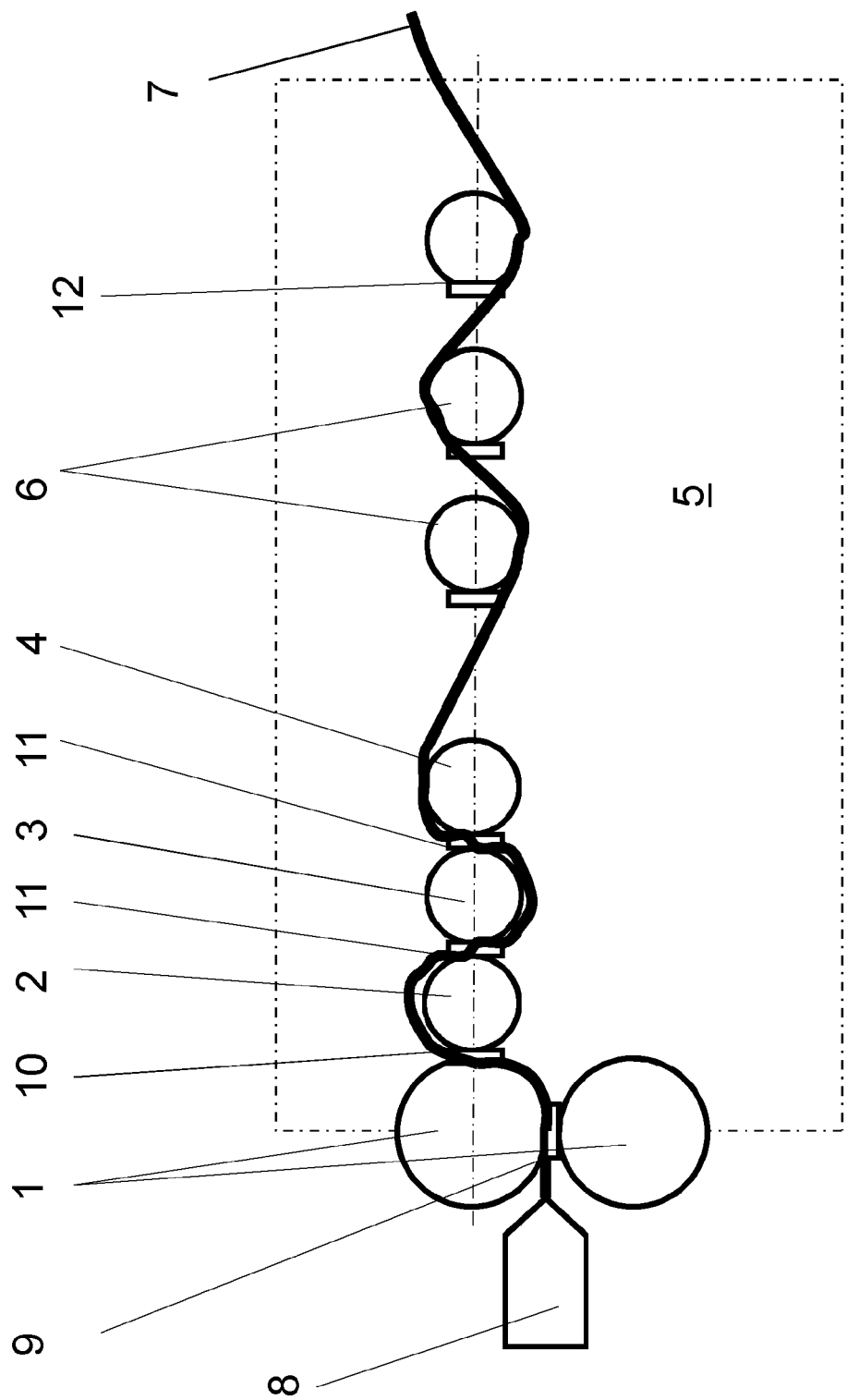
FIG. 2 shows the device in the closed state and with sheeting.

It is clear from FIG. 2 that the rolls have been moved into other positions; for example, a system having four sizing nips is shown here. By means of the slit die 8, plastics compound is introduced into the nip 9 between the main rolls 1 and pre-sized in a first step. The sheeting 7 passes through the nearest sizing nip 10 between a main roll 1 and the first downstream roll 2, and the sizing nip 11 between the rolls 2 and 3 and between 3 and 4.

The distances between these rolls and thus the produced sizing nip are selected such that the sheeting 7 is deformed in each nip such that a sheeting 7 of uniform quality is produced after passing through all the sizing nips.

The other downstream rolls 6 are moved into a position which is such that a sizing nip is not produced. The sheeting 7 circulates around these rolls 6 without being sized therebetween.

The adjusting elements 12 which are schematically shown therein are arranged laterally adjacent to the rolls and can change the position of the rolls with respect to one another. Since the adjusting elements are arranged on each side of each roll, each roll can be changed not only individually but also at an angle relative to the adjacent roll.

Figure 3:
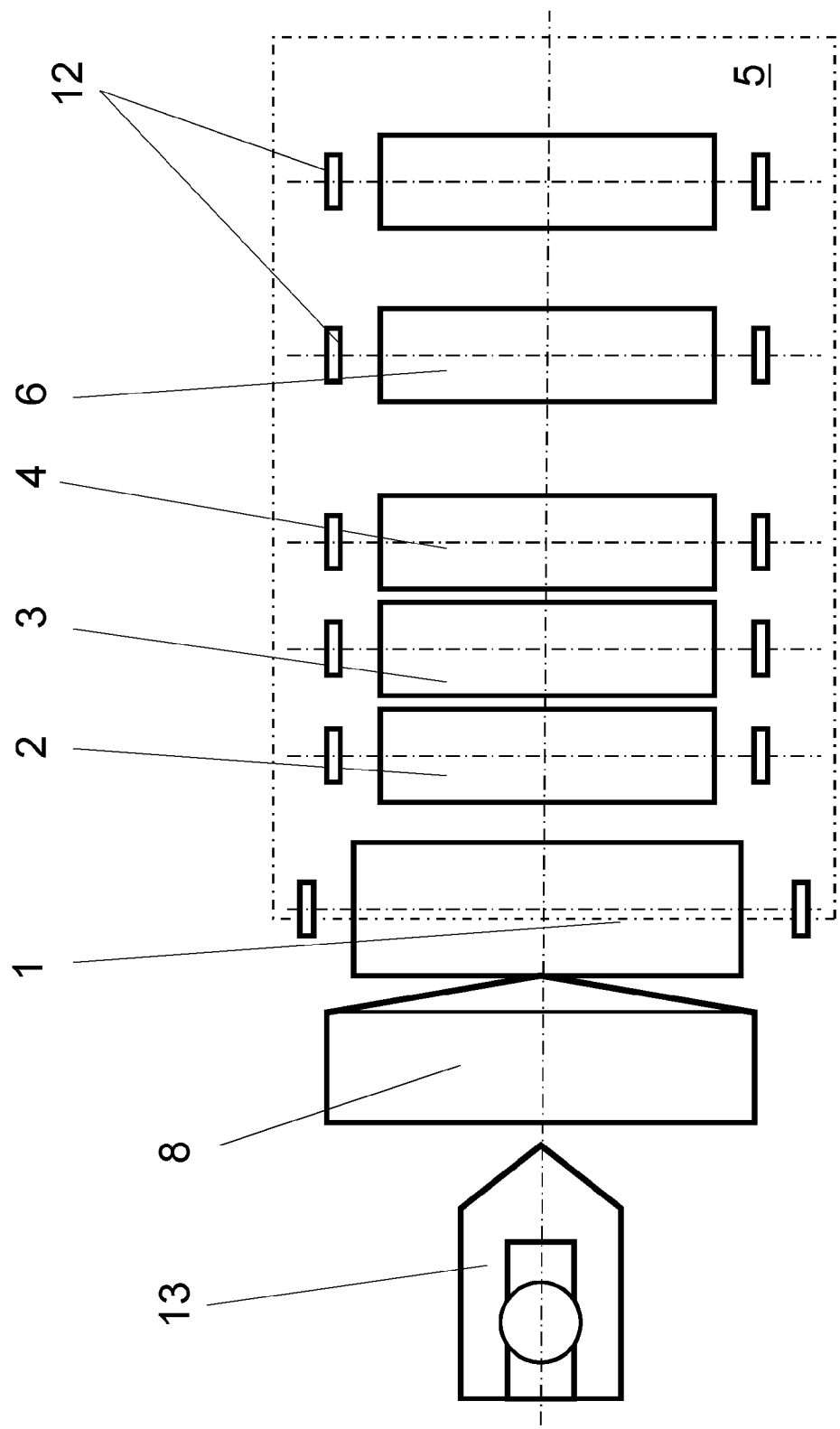
FIG. 3 shows a schematic construction of a system.

For clarity, seeing as FIGS. 1 and 2 both show cross-sections through system components, FIG. 3 is a plan view of a typical system having the essential components, such as an extruder 13, the rolls 1 to 4 and the polishing stack 5. Like or similar components are always denoted with like reference numerals in all the figures.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Main rolls
2 First downstream roll
3 Second downstream roll
4 Third downstream roll
5 Polishing stack
6 Other downstream rolls
7 Flat product
8 Slit die
9 Sizing nip between 1
10 Sizing nip between 1 and 2
11 Sizing nip between 2 and 3 or between 3 and 4
12 Adjustment element
13 Extruder

The invention claimed is:

1. A device for sizing and cooling an extruded flat product made of plastic material, the device comprising:
at least two main rolls;
a polishing stack including a plurality of downstream rolls arranged one behind the other and disposed downstream of the at least two main rolls;
wherein the at least two main rolls and the downstream rolls have respective diameters such that a contact area between the flat product and the at least two main rolls and the downstream rolls is substantially the same on both sides of the flat product; and
wherein an adjustable sizing nip is disposed between the adjacent pairs of the downstream rolls and between one of the at least two main rolls and an adjacent one of the downstream rolls, each adjustable sizing nip being individually adjustable during an extrusion process so as to pinch the flat product to a greater or a lesser extent.

2. The device recited in claim 1, wherein each adjustable sizing nip is adjustable to different sizes.

3. The device recited in claim 1, wherein the downstream rolls are adjustable such that the flat product is not pinched by the rolls.

4. The device recited in claim 3, wherein the at least two main rolls and the downstream rolls are drivable individually or together.

5. The device recited in claim 3, wherein the at least two main rolls and the downstream rolls are temperature controlled.

6. The device recited in claim 1 configured to monitor a temperature of the flat product at a plurality of temperature measuring points, and wherein each adjustable sizing nip is adjustable according to the temperature.

7. A method for sizing and cooling an extruded flat product made of plastic material, the method comprising:

influencing the flat product using at least two main rolls and a polishing stack region including a plurality of downstream rolls arranged one behind the other downstream of the main rolls;

winding the flat product around a portion of only one of the at least two main rolls so as to initially cool the flat product using the respective one of the at least two main rolls;

winding the flat product around a portion of each of the plurality of downstream rolls, wherein the at least two main rolls and the downstream rolls have respective diameters such that a contact area between the flat product and the one of the at least two main rolls and the downstream rolls is substantially the same on both sides of the flat product; and adjusting a sizing nip between the at least two main rolls and all of the respective adjacent downstream rolls individually, and between one of the at least two main rolls and an adjacent one of the downstream rolls during an extrusion process such that the flat product is pinched to a greater or a lesser extent in the sizing nip.

\* \* \* \* \*

(12) EX PARTE REEXAMINATION CERTIFICATE (11585th)
United States Patent
Roth

(10) Number: US 9,616,606 C1
(45) Certificate Issued: Oct. 21, 2019

(54) COOLING DEVICE AND COOLING METHOD FOR AN EXTRUDATE

(75) Inventor: Michael Roth, Bad Oeynhausen (DE)

(73) Assignee: BATTENFELD-CINCINNATI GERMANY GMBH, Bad Oeynhausen (DE)

Reexamination Request:
No. 90/014,235, Nov. 13, 2018

Reexamination Certificate for:
Patent No.: 9,616,606
Issued: Apr. 11, 2017
Appl. No.: 13/983,579
PCT Filed: Feb. 1, 2012
PCT No.: PCT/EP2012/051718
§ 371 (c)(1),
(2), (4) Date: Aug. 5, 2013
PCT Pub. No.: WO2012/104359
PCT Pub. Date: Aug. 9, 2012

(30) Foreign Application Priority Data

Feb. 3, 2011 (DE) .......... 10 2011 003 604

(51) Int. Cl.
*B29C 43/22* (2006.01)
*B29C 48/88* (2019.01)
*B29C 48/92* (2019.01)
*B29C 48/90* (2019.01)
*B29C 48/08* (2019.01)
*B29C 48/00* (2019.01)
*B29C 43/24* (2006.01)
*B29C 47/88* (2006.01)
*B29C 47/90* (2006.01)

(52) U.S. Cl.
CPC .......... *B29C 43/22* (2013.01); *B29C 43/24* (2013.01); *B29C 48/0011* (2019.02); *B29C 48/08* (2019.02); *B29C 48/907* (2019.02); *B29C 48/914* (2019.02); *B29C 48/9135* (2019.02); *B29C 48/92* (2019.02); *B29C 48/906* (2019.02); *B29C 2948/92209* (2019.02); *B29C 2948/92657* (2019.02); *B29C 2948/92704* (2019.02); *B29C 2948/92923* (2019.02)

(58) Field of Classification Search
None
See application file for complete search history.

(56) References Cited

To view the complete listing of prior art documents cited during the proceeding for Reexamination Control Number 90/014,235, please refer to the USPTO's public Patent Application Information Retrieval (PAIR) system under the Display References tab.

*Primary Examiner* — Norca L. Torres Velazquez

(57) ABSTRACT

A device for sizing and cooling an extruded flat product made of plastic material includes at least two main rolls and a polishing stack including a plurality of rolls arranged in tandem and disposed downstream of the main rolls. An adjustable sizing nip is disposed between all of the adjacent respective rolls. The sizing nip is adjustable so as to pinch the flat product during an extrusion process to a greater or a lesser extent.

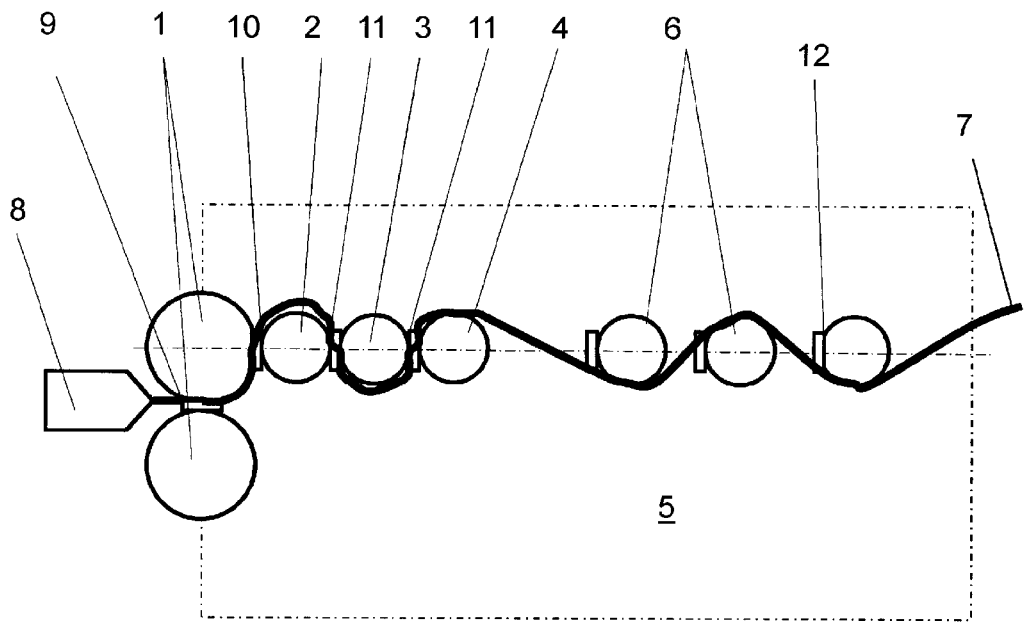

EX PARTE
REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-7 are cancelled.

* * * * *